Sept. 2, 1924.  1,506,807
H. F. BICKEL ET AL
METHOD OF CONTROLLING THE RELEASE OF AUTOMATIC AIR BRAKES
Filed July 7, 1922  4 Sheets-Sheet 2

Inventors
Henry F. Bickel
Blythe J. Munier

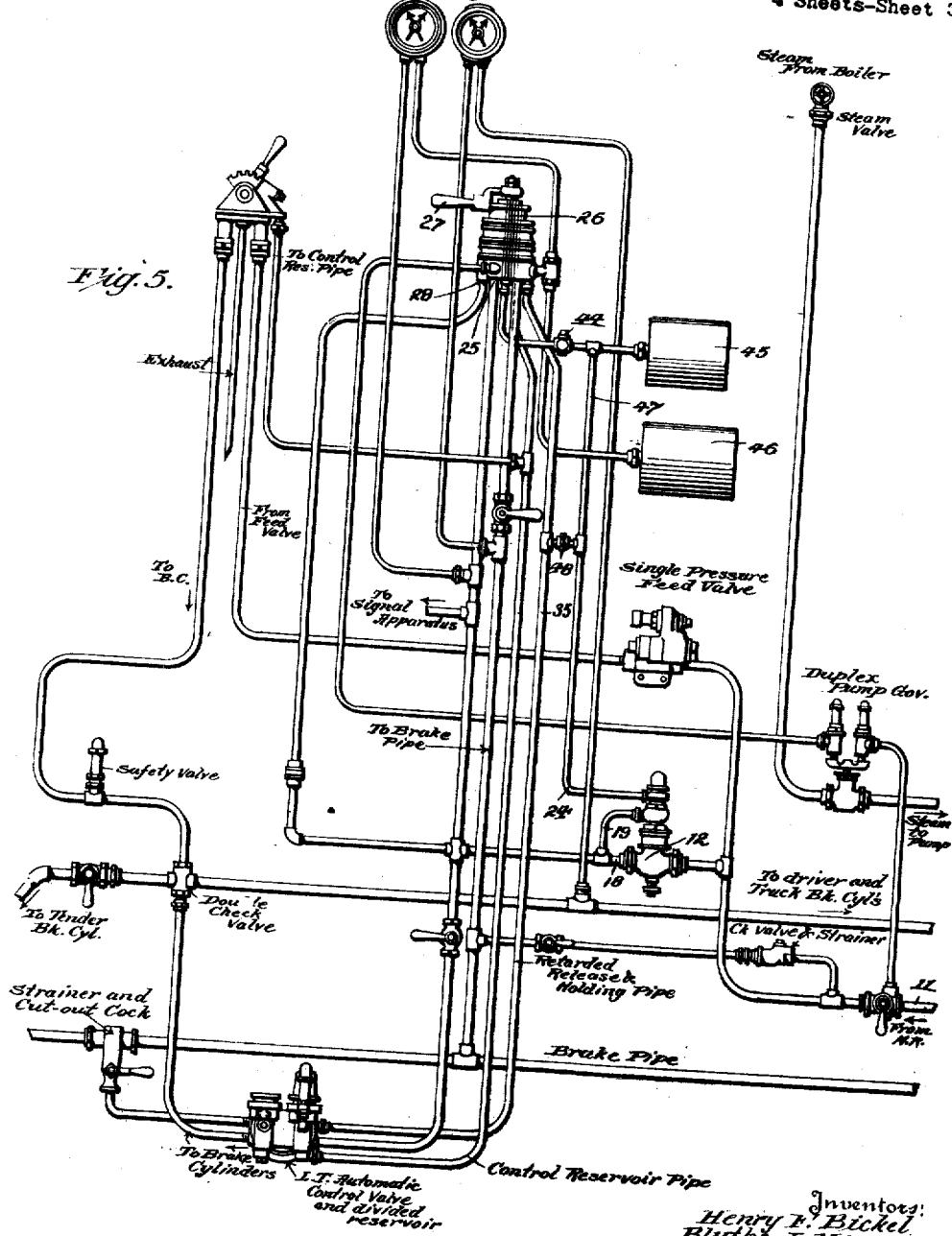

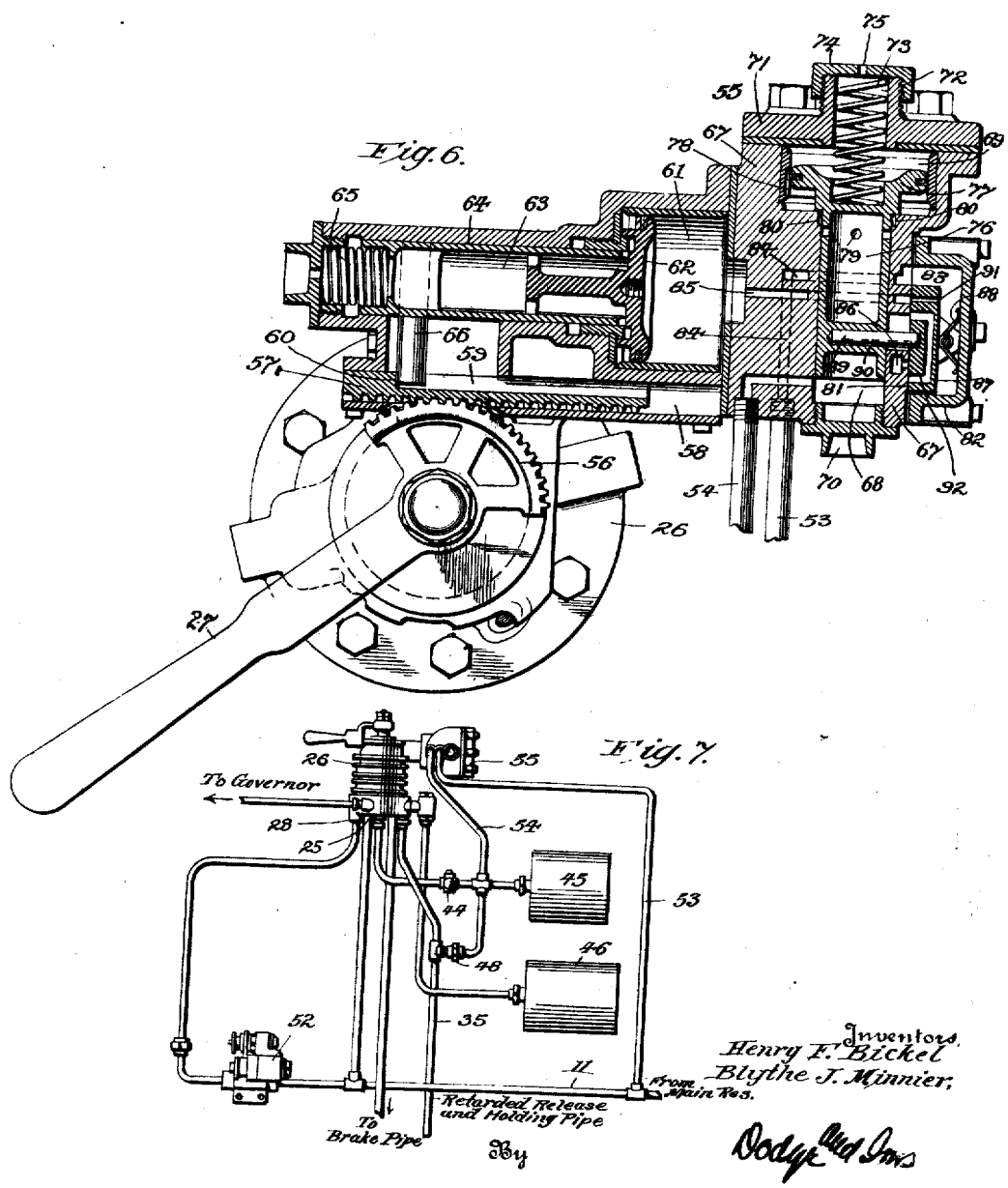

Patented Sept. 2, 1924.

1,506,807

UNITED STATES PATENT OFFICE.

HENRY F. BICKEL, OF PLAINFIELD, NEW JERSEY, AND BLYTHE J. MINNIER, OF WATERTOWN, NEW YORK, ASSIGNORS TO THE NEW YORK AIR BRAKE COMPANY, A CORPORATION OF NEW YORK.

METHOD OF CONTROLLING THE RELEASE OF AUTOMATIC AIR BRAKES.

Application filed July 7, 1922. Serial No. 573,326.

*To all whom it may concern:*

Be it known that we, HENRY F. BICKEL and BLYTHE J. MINNIER, citizens of the United States, residing, respectively, at Plainfield, in the county of Union and State of New Jersey, and at Watertown, in the county of Jefferson and State of New York, have invented certain new and useful Methods of Controlling the Release of Automatic Air Brakes, of which the following is a specification.

This invention relates to a method of controlling the brake releasing function of automatic air brake equipment of that type which includes auxiliary reservoirs and triple valves.

In air brake systems of this type, it is the practice to carry in the main reservoir a pressure higher than that maintained in the brake pipe. This relatively high main reservoir pressure offers a reserve of compressed air which is available to insure prompt movement of all the triple valves from application position, or from lap position, to release-and-recharge position.

In order to permit the engineer to control the admission of main reservoir pressure to the brake pipe, the engineer's brake valve is so constructed that it feeds air to the brake pipe at different rates in two different positions, one of which is known as "release position" and the other as "running position." In release position, main reservoir air is fed, without pressure reduction, from the main reservoir through the brake valve to the brake pipe, and this position is used to release the brakes and start the recharge of the auxiliary reservoirs. In running position, the main reservoir is connected to the brake pipe through the engineer's valve in such a way that a pressure reducing feed valve is interposed, and this valve operates to control the feed of air to the brake pipe, so that the desired brake pipe pressure is maintained but is not exceeded.

After a brake application has been made, the brakes are released by moving the engineer's brake valve first to release position and later to running position. The correct manipulation is to leave the valve in release position only long enough to insure the movement of all triple valves to release-and-recharge position. If it is left in release position too long, the reservoirs and brake pipe near the front of the train will be charged to too high a pressure so that, when the valve is moved back to running position, an undesired reapplication of the brakes on the front portion of the train will occur.

The time necessary to effect the movement of all the triple valves to release position is dependent on the length of the train and the intensity of the preceding brake application, i. e., on brake pipe volume and the reduction of brake pipe pressure, so that it requires the exercise of considerable discretion on the part of the engineer to estimate the time that the engineer's brake valve should be left in release position. This difficulty is greatly increased in modern equipment by the very long trains customarily used. The great variations in train length encountered require exercise of considerable forethought and judgment, while the use of exceedingly sensitive apparatus for the purpose of securing rapid serial application in long trains increases the tendency for reapplications to occur.

The present invention provides a method of limiting the duration of the release function of the engineer's brake valve, i. e., the unrestricted feed of main reservoir air to the brake pipe, to correspond with the length of the train and the intensity of the application which is to be released. The method does not require the exercise of discretion by the engineer, but may be carried out by automatic devices.

The method is based on a recognition of the fact that the amount of air discharged through the equalizing discharge valve forming a part of the engineer's brake valve is a function of the length of the train and of the intensity of the application which results from such discharge. The method involves the measurement or approximate measurement of the air discharged through the equalizing discharge valve, and, during the ensuing release function, the imposition of a corresponding time limit on the feed of air at main reservoir pressure to the brake pipe.

The simplest way of measuring the air discharged through the equalizing discharge valve is to impound this air or a proportional part thereof, under moderate pressure. This air is thereafter released through a restricted port in the release position of the engineer's valve, and the duration of outflow of this air is used to determine the duration of free flow of air from the main reservoir to the brake pipe.

While the termination of such outflow might be used as a signal to warn the engineer to shift the engineer's brake valve to running position, we prefer to accomplish this result automatically.

The simplest and preferred way of modifying existing equipment to practice the above described method by automatic means is to eliminate the pressure feed valve customarily used to feed air from the main reservoir to the brake pipe in running position of the engineer's valve, and to substitute therefor a pressure controlling valve equipped with pressure controlled means for holding it out of action. This pressure controlling valve is connected on its inlet side with the main reservoir and on its discharge side both to the feed valve connection and to the main reservoir connection of the engineer's brake valve. Consequently, the only communication from the main reservoir to the engineer's brake valve is through this pressure controlling valve.

The equalizing discharge valve of the engineer's brake valve is provided with a special discharge fitting having a restricted port leading to the atmosphere, and between the equalizing discharge valve and this restricted port a passage leads through a check valve to a small reservoir which we call the "brake pipe discharge reservoir." This reservoir is connected by a restricted port or choke to a port in the seat of the rotary valve of the engineer's brake valve and this port is open to atmosphere in the release and running positions of the engineer's brake valve. This port may conveniently be, but is not necessarily, a port also controlling the holding pipe connection used with the so-called "L. T." (locomotive and tender) equipment and may be arranged to offer a retarded release of the locomotive and tender brakes in release position and a quick release thereof in running position.

The brake pipe discharge reservoir is also connected to the pressure controlling valve in such manner that the existence of pressure in the reservoir so affects the pressure controlling valve as to hold this valve fully open.

Thus the reservoir is charged in service applications to a pressure dependent on the length of the train and the brake pipe pressure reduction. In release the air slowly escapes through the ports above mentioned and until it has escaped the pressure controlling valve is inoperative. The time of such escape varies according to the initial pressure in the reservoir and hence a proper time factor may be imposed on free flow from the main reservoir to the brake pipe, by properly proportioning the restricted escape port or choke.

Another automatic apparatus for carrying out the method involves the use of a small air motor for shifting the rotary valve of the engineer's brake valve from release to running position, and the control of this motor by the persistence of pressure in the brake pipe discharge reservoir described. In this second type of equipment, no pressure control valve is used and the ordinary feed valve is retained and is connected up to the engineer's brake valve and the main reservoir in the usual manner.

In the accompanying drawings are illustrated two specifically different types of apparatus capable of operating according to the above described method. In the drawings:—

Fig. 5 is a general view of the equipment carried on a locomotive showing how the parts illustrated in Fig. 1 are preferably connected with the straight air brake, the L. T. equipment, pump governor and the brake pipe.

Fig. 6 illustrates a modified apparatus also controlled by the retention and discharge of air in the brake pipe discharge reservoir, and serving to shift the engineer's valve from release to running position at the proper time.

Fig. 7 is a view showing how the valve illustrated in Fig. 6 is connected to air brake systems of known types.

Figure 1:
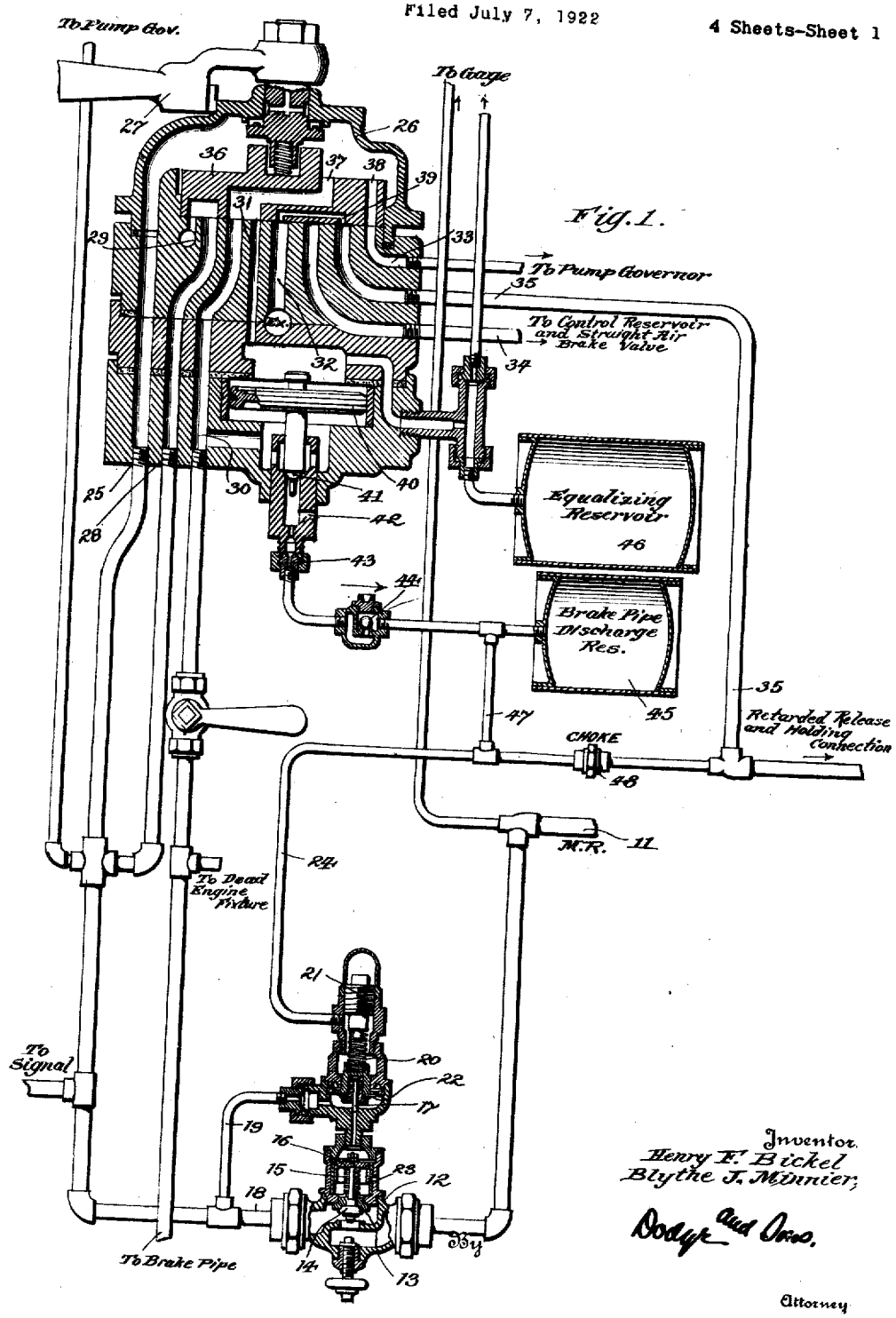
Fig. 1 is a sectional view showing the engineer's brake valve in release position connected up with the special exhaust fitting, check valve, brake pipe discharge reservoir, choke port and pressure controlling valve. In this view, the engineer's brake valve is not shown as actually constructed, but is diagrammed in the conventional manner familiar to those skilled in the art.

Referring first to Figs. 1 to 4 inclusive, air from the main reservoir is received through a pipe 11 and is delivered thereby to the inlet side of the pressure control valve 12. This valve is of a form familiar in the art. It is provided with a valve seat 13 and a valve member 14 which is urged away from the seat by a coil spring 15, and which may be forced to its seat by pressure acting on the upper side of a piston 16. Pressure is admitted to act against the upper side of the piston 16 through a needle valve 17. This needle valve receives pressure fluid from the discharge connection 18 of the valve 12 through a pipe connection 19. The valve 17 is urged to its seat by a spring 20 which is adjustable by means of the threaded plug 21. The valve 17 is urged in an opening direction by the pressure fluid entering through the pipe 19 and acting on the lower face of a diaphragm 22.

Consequently, the pressure in the pipe 18 acts through the pipe 19 against the lower face of the diaphragm 22. This results in opening the valve 17 and admitting pressure fluid to act on the upper face of the piston 16, thus urging the valve 14 toward its closed position. The space above the piston 16 is vented through a restricted orifice, indicated at 23, and the device as a whole functions to maintain a substantially constant pressure in the pipe 18, and this pressure is determined by the adjustment of spring 20 by plug 21. As stated, valves of this general type are known to those skilled in the art.

In order to suspend the regulating function of the valve 12, a connection 24 is provided which serves to admit pressure fluid at certain times to act against the upper side of the diaphragm 22 and thus reinforce the action of the spring 20. At such times, the valve 17 is held closed and, since the space above the piston 16 is vented, the valve member 14 remains in its upper position away from the seat 13. Consequently, the pressure reducing function of the pressure control valve 12 is suspended.

Pressure control valve 12, unlike the feed valve customarily used in air brake systems, controls the feed of air both to the main air connection and to the feed connection of the engineer's brake valve. Consequently, the pipe 18 is connected to the main air connection 25 and to the feed valve connection 28 of the engineer's brake valve 26.

Other ports visible in Fig. 1 are the warning port 29 which is open in release position, the brake pipe port 30, the equalizing cylinder port 31, exhaust port 32, pump governor port 33, the control reservoir port 34 and the holding pipe port 35.

In release position, the rotary valve 36, operated by the usual handle 27, establishes communication from the main air connection (i. e. from the space above the rotary valve) to the brake pipe and to the pump governor by means of the ports 37 and 38 at the same time the port 39 establishes a restricted connection between the control pipe 35 and the exhaust port 32. Consequently, in this position the locomotive and tender brakes are undergoing a retarded release due to the escape of air from the holding pipe 35 to exhaust.

The equalizing discharge piston and its cylinder are indicated generally at 40 and the equalizing discharge valve at 41. Each valve is supplied with a special fitting formed with a lateral exhaust port 42 which is relatively restricted, and a second restricted connection 43 which leads to a check valve 44 and thence to a closed reservoir 45 which we call the brake pipe discharge reservoir. The equalizing reservoir is shown at 46 and is of usual construction. Leading from the brake pipe discharge reservoir, there is a direct connection by means of the pipe 47 to the pipe 24, which is connected as already described, to admit pressure fluid against the upper side of the diaphragm 22. The pipes 47 and 24 are both connected through a choke or restricted port 48 to the holding pipe 35.

Figure 2:
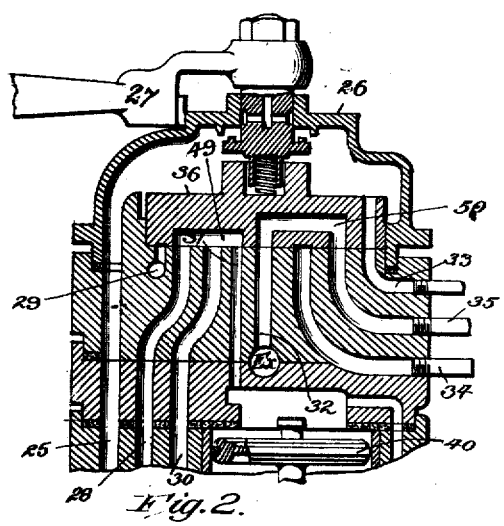
Fig. 2 is a fragmentary view, similar to Fig. 1, showing the engineer's brake valve in running position.

In Fig. 2, which shows the device in running position, the feed valve connection and the brake pipe connection are placed in direct communication by means of the port 49 in the rotary valve. At the same time the holding pipe 35 is placed in direct and free communication with the exhaust port 32 by means of the port 50 also formed in the rotary valve.

Figure 3:
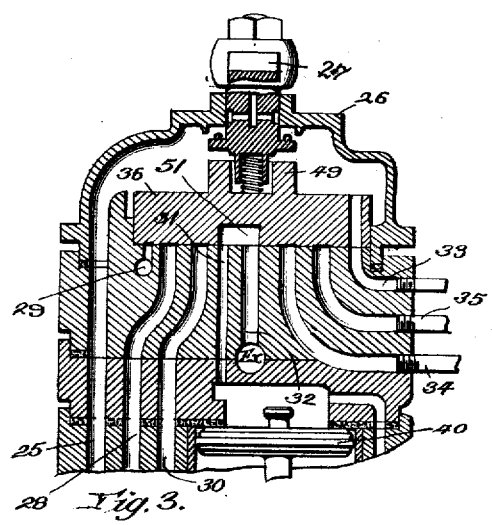
Fig. 3 is a similar view showing the engineer's brake valve in service application position.
Figure 4:
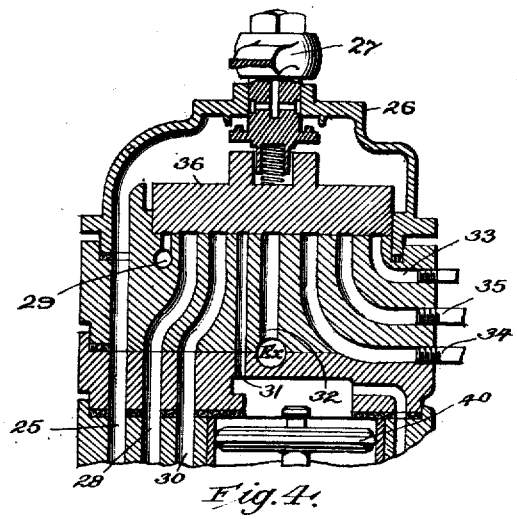
Fig. 4 is a similar view showing the engineer's brake valve in lap position.

In Fig. 3, which shows the service position, the equalizing chamber is connected to exhaust by means of the port 51 in the rotary valve, while, in Fig. 4, which shows lap position, all ports are blanked. It should be observed in this connection that the valve structure above described departs from former standard practice to the extent that the port 39 provides for retarded release of the engine and tender brakes in release position, and the port 50 provides for quick release of the engine and tender brakes in running position. This arrangement makes it conveniently possible to vent the brake pipe discharge reservoir through the holding pipe 35.

The engineer's valve has also a "holding" position and an "emergency" position, neither of which is illustrated and each of which conforms in structure and function with standard practice. They are not illustrated because neither directly affects the method here involved.

In Fig. 5, we have shown the apparatus so far described as it appears when connected in an air brake system of conventional form, and we have indicated most of the standard apparatus forming part of the well known New York air brake system by means of legends. The parts illustrated in Figs. 1 to 4 inclusive are indicated by the reference numerals heretofore used so far as these parts are visible in Fig. 5. The purpose of Fig. 5 is to indicate to those skilled in the art how the connections to the straight air brakes, the gages, the pump governor, the locomotive and tender equipment and the like are made, and, inasmuch as the installation conforms to standard practice, except as is described in detail above, no detailed discussion of Fig. 5 appears necessary.

Assume that the train is running with the brakes released. The engineer makes a service application. Air will be vented from the brake pipe through the equalizing discharge valve 41. Part of this air flows to the atmosphere through the port 42, but a part will pass through the port 43 and check valve 44 and be confined under moderate pressure in the brake pipe discharge reservoir 45. The quantity so confined in the reservoir 45 is approximately proportional to the total amount released from the brake pipe, or at any rate it is a function of the total amount so released.

The pressure in the reservoir 45, acting on the upper side of diaphragm 22, suspends the pressure reducing function of the valve 12. Consequently, on movement of the brake valve to release position, air flows without pressure reduction from the main reservoir pipe through valve 12, main air connection 25, and ports 37 and 30 to the brake pipe.

In release position, the port 39 in the rotary valve connects the holding pipe 35 with exhaust. This causes slow release of the locomotive and tender brakes, and allows the air in reservoir 45 to discharge through choke 48. Since choke 48 is more restricted than port 39, the rate of flow from reservoir 45 is controlled solely by the choke.

As the pressure in the reservoir 45 falls, the pressure reducing function of the valve 12 is restored. Thereafter, both in release position and in running position, air will be fed from the main reservoir to the brake pipe at reduced pressure. The quantity of air confined in reservoir 45 thus imposes a time factor on the free flow of air to the brake pipe.

In this form of the device, the chief functional difference between release and running positions is that release position causes retarded release and running position quick release of the locomotive and tender brakes.

Referring now to Figs. 6 and 7, a second type of mechanism operating on the same method, but acting to shift the rotary valve of the engineer's brake valve, will be described.

The engineer's brake valve is indicated generally by the numeral 26 and is provided with ports 39 and 50 and with a special exhaust fitting for the equalizing discharge valve, all identical with those shown in detail in Fig. 1. The holding pipe is indicated at 35 and is identical with that described with reference to Fig. 1. The same is true of the equalizing reservoir 46, brake pipe discharge reservoir 45 and check valve 44. The choke 48 is interposed between the brake pipe discharge reservoir 45 and the holding pipe 35.

The main reservoir pipe is shown at 11 and is connected, as has been customary heretofore, to the main air connection 25 of the engineer's brake valve to supply the space above the rotary valve with air at main reservoir pressure. Leading from the pipe 11 is a connection through the pressure reducing feed valve 52 to the feed connection 28 of the engineer's brake valve. Consequently, as has been the usual practice, the engineer's valve 26, when in release position, feeds main reservoir air to the brake pipe without reduction of pressure, and, when in running position, feeds main reservoir air to the brake pipe at reduced pressure.

Leading from the main reservoir pipe 11 is a pipe 53 and leading from the brake pipe discharge reservoir is a pipe 54. These two pipes are connected so that the first supplies motive fluid to, and the second controls the operations of, a motor 55 whose function is to shift the engineer's brake valve from release to running position. This motor is shown in diagrammatic section in Fig. 6.

The handle 27 of the engineer's brake valve is provided with a sector gear 56 and this gear meshes with a rack 57 slidable longitudinally in a guideway 58. The rack 57 is provided with a longitudinal slot 59 having at its left-hand end (with reference to Fig. 6) a shoulder or stop 60.

Forming a part of the motor 55 is a cylinder 61 containing a piston 62. This piston is partly guided by, and abuts against, the end of a sleeve 63 which is longitudinally slidable in a guideway 64 forming a part of the motor. The sleeve 63 is urged to the right (with reference to Fig. 6) by a spring 65 and is provided with a pin 66 which runs in the slot 59 and under certain circumstances abuts against the stop or shoulder 60 to move the rack 57 and thus shift the valve handle 27 through its connected sector gear 56.

When the piston 62 is at its right-hand limit of motion, the spring 65 shifts the sleeve 63 so that the pin 66 is moved to the right. With the parts in this position, the pin 66 permits the rack 57 to move far enough to the right to permit the engineer to move the brake valve handle 27 to release position. When the sleeve 63 is in its extreme left-hand position, as shown, the handle 27 cannot be moved to release position but is arrested by the stop 60 in running position. Obviously, if the valve handle 27 is placed in release position and thereafter sufficient pressure is admitted to act against the right-hand face of piston 62, the movement of the piston 62 to the left will shift the valve handle 27 from release to running position.

The admission of pressure fluid to act against the right face of the piston 62 and the release of such pressure are controlled by a piston-actuated slide valve mechanism subject to the persistence of pressure in the brake pipe discharge reservoir.

Mounted on, and forming a head for, the cylinder 61 is a casting 67 provided with a relatively small cylinder 68 and a larger co-axial cylinder 69 communicating therewith. The end of the cylinder 68 is closed by a screw plug 70, and the end of the cylinder 69 is closed by a cap 71. This cap 71 is provided with a cylindrical spring seat 72. A coil spring 73 is mounted in the cylindrical seat 72 and bears against a removable cap 74 provided with an air vent 75. The cylinders 68 and 69 receive a differential piston consisting of a sleeve piston 76, which works in the cylinder 68, and a piston 77, which works in the cylinder 69 and is directly engaged by the spring 73.

For purpose of explanation, the directions of movement of the pistons 76 and 77 will be defined by the terms "upward" and "downward" (with reference to Fig. 6).

The spring 73 urges the differential piston 76, 77 downward and, in this position, a groove port 78, formed in the walls of cylinder 69, equalizes the pressure on the opposite sides of the piston head 77. Since the space at the upper side of the piston head 77 is vented to the atmosphere through the port 75, the effect of opening the groove port 78 is to establish atmospheric pressure in the annular space below the piston head 77. The piston 76 is formed with a tubular body which establishes communication from the space below the piston to the ports 79. In the lowest position of the differential piston 76, 77, these ports are closed, but, in a slightly higher position of the differential piston, they communicate with an annular groove port 80 and in conjunction with it establish a connection from the space below the piston 76 to the annular space below the piston 77. The pipe 54, which leads from the brake pipe discharge reservoir, is connected to the space below the piston 76.

Formed on the casting 67 is a slide valve seat 81 which is housed by a cap 82 forming a pressure chamber 83 to which main reservoir air entering through the pipe 53 is communicated by a port 84. The valve seat 81 is formed with a port 85, leading to the cylinder 61, and with an exhaust port 86, leading to the atmosphere. A slide valve 87 is mounted on the seat 81 and is held to its seat by a leaf spring 88. This valve is connected by a pin 89 with the piston 76.

The pin 89 is seated in a web 90 extending across the bore of the tubular piston 76, but not obstructing the same, there being as heretofore explained a space for the free passage of air through the bore of the piston 76 around the web 90 to ports 79.

The slide valve 87 is provided with an admission port 91 which, in the lower position of the valve 81, connects the pressure space 83 with the port 85 and hence with the cylinder 61. The valve 81 is further provided with an exhaust port 92 which, in the upper position of the valve 81, connects the port 85 and hence the cylinder 61 with the exhaust port 86.

The operation of the device illustrated in Figs. 6 and 7 may now be outlined. Suppose that the train is running with the brakes released, and that the engineer makes a service application in the usual manner. This involves the release of air through the equalizing discharge valve. A portion of this air passes the check valve 44 and is confined in the brake pipe discharge reservoir 45. Since the brake pipe discharge reservoir is connected by the pipe 54 to the lower end of the cylinder 68, the pressure acting against the lower side of the piston 76 will gradually rise as the reservoir 45 is charged. The effect of this pressure is gradually to overpower the spring 73 so that the piston structure 76, 77 begins to move upward. Before it has moved far enough to change the relation of the ports of the valve 87, the piston head 77 will over-travel the groove port 78, and the ports 79 will reach the annular port 80.

The effect of the closing of the port 78 and the opening of the ports 79 is to admit the brake pipe discharge reservoir pressure against the annular lower surface of the piston head 77, greatly increasing the effective area against which this pressure acts and, consequently, causing the sudden movement of the differential piston 76, 77 to its extreme upward position. This movement shifts the valve 87 so that the supply of pressure fluid to cylinder 61 is cut off and the cylinder 61 is connected to atmosphere by means of the exhaust port 92.

The spring 65 then moves the sleeve 63 and with it the piston 62 to their right-hand positions. This moves the pin 66 to its extreme right-hand position so that the valve handle 27 may be moved to release position. The parts remain in this condition until after the engineer has commenced to release the brakes. To release the brakes, he moves the valve handle 27 to release position. In this position, the main reservoir air flows freely to the brake pipe and, at the same time, the port 39 effects a retarded release of the locomotive and tender brakes, and a slow discharge of air from the brake pipe discharge reservoir 45 through the choke 48.

As the brake pipe discharge reservoir pressure drops, a point will be reached at which the spring 73 begins to move the piston structure 76, 77 downward. A slight movement of this piston structure opens the port 78 and closes the ports 79, causing a sudden reduction in the effective area against which the brake pipe discharge reservoir pressure acts so that the spring completes the movement of the piston structure and its connected valve 87 with great rapidity. As the piston structure 76, 77 approaches the lower limit of its motion, the valve 87 cuts off the exhaust connection from the port 85 and establishes a pressure connection from the space 83 through the ports 91 and 85 to the cylinder 61. Pressure fluid entering through this connection forces the piston 62 to the left, overpowering the spring 65 and shifting the brake valve handle 27 to running position through the action of the pin 66, shoulder 60, rack 57 and sector gear 56.

The mechanisms above described are merely two of many automatic mechanisms which may be devised to operate according to the method forming the subject matter of the present application. The claims of this application are restricted to the method, the claims to the apparatus being presented in related applications as follows: Serial No. 597,967, filed October 30, 1922. Serial No. 665,660, filed Sept. 29th, 1923.

The broader method claims of the present application are not restricted to the use of automatic means for terminating the release function of the engineer's brake valve, but are drawn broadly to the idea of measuring the air released from the brake pipe and thereafter using this measurement to determine the duration of the release function of the engineer's valve. Such determination may involve merely the giving of a proper indication to the engineer of the duration of the proper release period and may, therefore, require the attention and cooperation of the engineer, or may be made entirely automatic.

What is claimed is:—

1. That method of controlling the release of automatic air brakes, including a brake pipe and a main reservoir normally charged to a pressure higher than brake pipe pressure, which consists in measuring the quantity of air discharged from the brake pipe in producing a brake application, and thereafter, during the releasing of said application, limiting the duration of flow of air at main reservoir pressure to the brake pipe according to such measurement.

2. That method of controlling the release of automatic air brakes, including a brake pipe and a main reservoir normally charged to a pressure higher than brake pipe pressure, which consists in confining under pressure air released from the brake pipe in producing a brake application, the quantity of air so confined being a function of the total quantity of air released from the brake pipe, and thereafter, during the releasing of such application, permitting the gradual escape of the confined air and limiting the duration of flow of air at main reservoir pressure to the brake pipe according to the duration of such escape.

3. That method of controlling the release of automatic air brakes, including a brake pipe and a main reservoir normally charged to a pressure higher than brake pipe pressure, which consists in confining under pressure air released from the brake pipe in producing a brake application, the quantity of air so confined being a function of the total quantity of air released from the brake pipe, and thereafter, during the releasing of such application, permitting the escape of said confined air at a controlled rate, while subjecting the duration of unrestricted feed from main reservoir to brake pipe to control by such escape.

4. That method of controlling the release of automatic air brakes, including a brake pipe and a main reservoir normally charged to a higher pressure than the brake pipe, which consists in automatically limiting the duration of free flow of air from main reservoir to brake pipe to effect release of an application, according to the quantity of air previously released from the train pipe to effect such application.

5. That method of controlling the release of automatic air brakes, including a brake pipe, a main reservoir normally charged to higher pressure and controlling valve means having a release condition in which main reservoir air is fed without pressure reduction to the brake pipe, and a running condition in which main reservoir air is fed at reduced pressure to the brake pipe, which consists in manually establishing such release condition, and then automatically converting to running condition after a time interval imposed by the quantity of air discharged from the brake pipe to effect the application undergoing release.

In testimony whereof we have signed our names to this specification.

HENRY F. BICKEL.
BLYTHE J. MINNIER.